United States Patent [19]
Maderek

[11] Patent Number: 6,034,002
[45] Date of Patent: Mar. 7, 2000

[54] SEALING TAPE FOR SEALING PIPE JOINTS

[75] Inventor: Eugeniusz Maderek, Wuppertal, Germany

[73] Assignee: Akzo Nobel Nv, Arnhem, Netherlands

[21] Appl. No.: 08/817,301

[22] PCT Filed: Nov. 30, 1995

[86] PCT No.: PCT/EP95/04720

§ 371 Date: Apr. 15, 1997

§ 102(e) Date: Apr. 15, 1997

[87] PCT Pub. No.: WO96/16800

PCT Pub. Date: Jun. 6, 1996

[30] Foreign Application Priority Data

Dec. 1, 1994 [DE] Germany .............................. 44 42 798

[51] Int. Cl.[7] .................................................. D03D 3/00
[52] U.S. Cl. ........................... 442/59; 442/286; 442/287; 442/291; 442/304; 442/324; 442/394; 442/395; 442/416
[58] Field of Search ................................... 442/286, 287, 442/291, 304, 324, 394, 395, 416, 59

[56] References Cited

U.S. PATENT DOCUMENTS

| | | | |
|---|---|---|---|
| 3,614,967 | 10/1971 | Royston . | |
| 4,251,652 | 2/1981 | Tanaka et al. . | |
| 4,295,911 | 10/1981 | Haage et al. . | |
| 4,436,896 | 3/1984 | Okamoto et al. . | |
| 4,493,870 | 1/1985 | Vrouenraets et al. . | |
| 4,521,465 | 6/1985 | Schröer et al. | 428/35 |
| 4,572,868 | 2/1986 | Hosaka et al. . | |
| 4,632,860 | 12/1986 | D'Antonio et al. | 428/290 |
| 4,705,715 | 11/1987 | DeCoste, Jr. et al. . | |
| 4,725,481 | 2/1988 | Ostapchenko | 428/213 |
| 4,847,142 | 7/1989 | Twilley et al. | 428/252 |
| 5,096,206 | 3/1992 | Andre et al. . | |
| 5,614,302 | 3/1997 | Nance, Jr. | 442/286 |
| 5,631,074 | 5/1997 | Herlihy, Jr. | 442/35 |
| 5,743,775 | 4/1998 | Baurmeister | 442/77 |

FOREIGN PATENT DOCUMENTS

| | | |
|---|---|---|
| 0 040 788 A1 | 12/1981 | European Pat. Off. . |
| 74 39 211 | 11/1974 | Germany . |
| 30 20 157 A1 | 12/1981 | Germany . |
| 31 15 487 A1 | 11/1982 | Germany . |
| 87 04 586 U1 | 9/1987 | Germany . |
| 40 15 394 C1 | 5/1990 | Germany . |
| 91 09 196 1 U | 11/1991 | Germany . |
| 92 05 61 U1 | 7/1992 | Germany . |
| 51-111 290 | 1/1976 | Japan . |
| 1 406 321 | 9/1975 | United Kingdom . |
| 1 494 685 | 12/1977 | United Kingdom . |
| WO 94/26804 | 11/1994 | WIPO . |

OTHER PUBLICATIONS

Derwent Abstract 92–065756, (Feb. 1992).
German Industrial Standard (DIN) No. 53 857, Sep. 1979.
German Book, "Textile Faserstoff", W. Bobeth et al., p. 98–101 (1993).
Derwent Abstract No. 76–86050X, Oct. 1976.
Derwent Abstract No. 81–91370D, Dec. 1981.
Derwent Abstract No. 95–061439/09; (Feb. 1995).
Derwent Abstract No. 94–359279, Nov. 1994.
Derwent Abstract No. 89–300345/41, Aug. 1989.
Derwent Abstract No. 87–168140/24, May 1987.
Derwent Abstract No. 87–017870/03, Dec. 1986.
Derwent Abstract No. 80–15279C/09, Feb. 1980.
Derwent Abstract No. 92–065756, Feb. 1992.

*Primary Examiner*—Helen L. Pezzuto
*Attorney, Agent, or Firm*—Oliff & Berridge, PLC

[57] ABSTRACT

The invention relates to a sealing tape which is suitable for winding around pipe ends, especially pipe threads, and for sealing screw pipe joints and spigot pipe joints, which has a waterproof functional layer, preferably with one or more base layers, where the functional layer contains polymers on polyetherester basis, polyurethane basis and/or polyetheramide basis, and the use of the sealing tape in heating pipes, utility water pipes, drinking water pipes, water vapor pipes, gas pipes, compressed air pipes, industrial valves and valves used in domestic installations.

26 Claims, No Drawings

SEALING TAPE FOR SEALING PIPE JOINTS

BACKGROUND OF THE INVENTION

1. Field of the Invention

The invention relates to a sealing tape which is suitable for winding around pipe ends, preferably pipe threads, and for sealing threaded joints, screw fittings and pipe joints, which has a waterproof functional layer, preferably with one or more base layers, and the use thereof.

2. Discussion of Related Art

It is known that pipelines are joined together by means of pipe joints such as screw joints or spigot joints. Screw joints primarily occur in the form of threaded pipes or so-called fittings, which enable changes of direction in the pipe run, branching or the termination of threaded pipes or pipelines. Like the pipelines, these shaped parts can be manufactured from various materials and can take the form of tees, bends, crosses, sockets, reducing sockets or reducing nipples. The end of the piping or the pipe element is for example in the form of an external taper thread and the end of the screw fitting has an internal cylindrical thread.

In order to make the joints between the screw fittings and the piping strong and leakproof the thread flanks of the pipe end and the screw joint must be pressed firmly onto one another by means of a certain thread reach. For this reason it is necessary to wind a hemp bundle normally around the external thread of the pipe end, whereby the hemp bundle is laid axially along the thread reach starting from the end of the thread and then wound clockwise around the thread from the start of the thread. To make sure the hemp does not unwind again and that it is lubricious when the pipe fitting is screwed in, the hemp must be coated with a paste-type sealant, which is a lengthy process requiring exacting work.

After the screw fitting has been screwed onto the end of the pipe the protruding hemp is removed using a hand hacksaw. Here, however, there is a danger firstly, that the user will injure himself with the hand hacksaw due to fact that the paste-type sealant has made the surface slippery, and secondly, that the hemp will be pulled out of the turns of the thread by the saw blade.

Moreover, as it is a natural product hemp is subject to aging which reveals itself in the form of drying out and decaying. Although the aging process can be delayed by means of the sealant applied to the hemp, it is impossible to prevent it entirely, and thus there is a danger of screw pipe joints in time becoming leaky and therefore requiring continual checking.

Also touching hemp is an unpleasant sensation for the user, since it feels rough and scratchy. Moreover, skin contact with hemp has often been observed to give rise to irritations and even allergies.

In order to eliminate the above disadvantages, DE-PS 40 15 394 proposes a sealing tape which appears to be suitable for sealing threads in pipe installations, and in which small hemp fibers or hemp-like man-made fibers are bonded to polytetrafluoroethylene sheeting or embedded in the sheeting. Although this sealing tape delays the drying-out experienced by the hemp, it is evident that if the polytetrafluoroethylene sheeting is damaged by the pipe end being screwed in and out or is screwed along with it into the screw joints, there is a danger that the hemp fibers will still lose moisture, even if they now do so more slowly, and the substances in the pipelines such as water or gas will seep out due to the sealing tape becoming brittle. This process is encouraged still further if the piping system is subjected to large changes in temperature or continuously subjected to medium or high temperatures.

In addition it cannot be ignored that although the sealing tape coated with polytetrafluoroethylene is thermally stable, its heat stability is impaired due to the presence of hemp fibers in the sealing tape and permanent sealing is not guaranteed.

In order to make the screw joint reasonably leakproof, sealing tapes consisting of polytetrafluoroethylene also have to be wound around the external thread of the pipe element several times, a time-consuming process. It is evident here that the joint will become leaky even if the screw fitting becomes only slightly unscrewed. In the day-to-day work of a heating technician for example, it is often necessary to unscrew the fitting in order to correct the relative positions of the screw fitting and the pipe element and only by means of such adjustment can elbows in the heating installations of a building be adapted to the structure of the masonry.

Moreover, this state of the art completely overlooks the fact that in case of fires in the building or when piping or screw joints are reconditioned there is a danger that decomposition products containing fluorine, such as fluorophosgene, carbonyl fluoride, tetrafluoromethane, HF, hexafluoroethane, trifluoroacetylfluoride and perfluoroisobutene are produced, which in part are highly toxic. The long-term action of these decomposition products on humans causes so-called polymer fume fever and pulmonary edemas. Moreover, the decomposition products containing fluorine will hamper the work of fire fighters if a fire breaks out in the building.

SUMMARY OF THE INVENTION

The object of the present invention is to make available a sealing tape which does not have the above disadvantages. In addition it is desirable not only that the sealing tape is sufficiently leakproof and strong when the screw fitting is screwed in and out of the internal thread of the pipe element, but also that the substances in the pipelines such as drinking water or hot water do not attack the tape. Moreover, the sealing tape should be easy to work and handle.

These objects are achieved by a sealing tape suitable for winding around pipe ends, preferably pipe threads, and for sealing threaded joints, screwed joints and pipe joints, which has a waterproof functional layer, preferably with one or more base layers, and which is characterized in that the functional layer contains polymers on polyetherester basis, polyetheramide basis and/or polyurethane basis. Pipe joints are understood to be screw joints and spigot joints.

An additional subject of the invention relates to the use of the sealing tape of the invention in screw joints to wind around the threads of threaded pipes and to seal the joints and in spigot joints to wind around pipe ends and to seal the spigot joints.

DETAILED DESCRIPTION OF PREFERRED EMBODIMENTS

It has been shown that the sealing tape of the invention can rapidly and easily be wound around an external thread of a pipe end, without having to make sure—as for hemp—that the tape is laid in the grooves of the thread in a precisely axial manner. Preferably the sealing tape of the invention is wound around the external thread such that the functional layer faces the external thread. Due to the fact that the sealing tape of the invention can be brought into close contact with the pipe ends made of cast iron materials, roughening of the thread with a wire brush is no longer necessary in contrast to the use of hemp. The good adhesion prevents the sealing tape being screwed out or screwed along when the pipe end is screwed into or out of the screw joints and also prevents the sealing tape being pulled away when the pipe end is pulled out of or pushed into a spigot joint.

In contrast to traditional sealing materials such as hemp or flax the sealing tape of the invention proves to be largely chemically inert to the liquid or gaseous substances in the piping such as utility water, hot water, drinking water, methane or town gas, meaning that the sealing tape of the invention is only subject to very slight aging and there is no danger of the substances in the pipeline seeping into and then through the sealing tape of the invention, as is observable in the case of the polytetrafluoroethylene sealing tapes coated with hemp fibers.

In a preferred embodiment of the subject of the invention at least one base layer, which is preferably porous, can be arranged on at least one side of the functional layer. Here it proves advantageous for the base layer to be a nonwoven, felt, knitted fabric and/or woven fabric. In particular when the sealing tape is utilized with the functional layer facing the external thread, it adheres particularly well to the surface of the external thread. In addition, brushing the hemp or the flax bundles into the thread turns, which was formerly necessary, is no longer required, making handling easier and cutting the time required. Along with the stated advantages, which are to be regarded as surprising for one skilled in the art, another benefit is that it is sufficient to wind the sealing tape around the external thread of the piping only once to guarantee that the joint will be leakproof. This also contributes to the desired improvement in terms of the speed and ease with which the sealing tape of the invention can be worked.

In a further embodiment of the subject of the invention the nonwoven, felt, knitted fabric and/or woven fabric can contain natural fibers and/or chemical fibers, whereby the natural fibers comprise cotton, linen, jute, hemp and/or sisal. If a functional layer with polymers on polyetherester, polyurethane and/or polyetheramide basis is used the drying-out observed in the conventional sealing tapes coated with polytetrafluoroethylene does not occur in the organic natural fibers. The chemical fibers can be synthetic fibers and/or regenerated and/or modified cellulose fibers, whereby one or more representatives of the group comprising polyester, polyamide, polyacrylic, polyvinylchloride fibers and mixtures of these are selected for the synthetic fibers.

A nonwoven with a weight per unit area of 20 to 200 g/m$^2$, preferably 50 to 100 g/m$^2$, is advantageous. The functional layer can be bonded to the base layer in spots, in a grid pattern and/or in strips. In a particular embodiment of the sealing tape of the invention the functional layer can be made so thick that under compression the functional layer is not completely incorporated into the interstices in the nonwoven, felt, knitted fabric and/or woven fabric.

The leakage which occurs with conventional polytetrafluoroethylene sealing tapes coated or provided with natural fibers, when even if the pipe joint is only unscrewed slightly the sheeting is found to experience considerable damage and inner displacements of the wound sealant-bearing tape layers are noted, is not observed when the sealing tape of the invention is used. Although the compressive and shear stresses arising when the pipe end is screwed into the fitting cause it to deform, the threaded pipe joint remains essentially leakproof, which must be regarded as surprising to one skilled in the art considering the many and diverse disadvantages of the state of the art which were highlighted above.

It is advantageous if the functional layer has a thickness of 5 to 200 µm when unstressed, preferably 10 to 100 µm. Sealing tapes of the invention with a functional layer thickness of 10, 15 or 20 µm when unstressed are especially advantageous.

In a further embodiment of the subject of the invention the polymers of the functional layer can be copolyether esters that are derived from longer-chain polyglycols, short-chain glycols with 2 to 4 carbon atoms, and dicarboxylic acids. Preferably, the polymers are copolyether esters comprising a large number of recurring intralinear long-chain and short-chain ester units that are randomly linked head to tail through ester bonds, where the long-chain ester units correspond to the formula

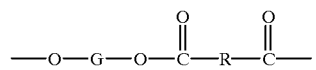

and the short-chain ester units correspond to the formula

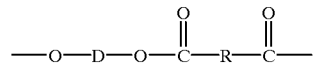

where G represents a divalent residue remaining after terminal hydroxyl groups are removed from at least one long-chain glycol with a mean molecular weight of 600 to 6000 and an atomic carbon-to-oxygen ratio of between 2.0 and 4.3, where at least 20% by weight of the long-chain glycol has an atomic carbon-to-oxygen ratio between 2.0 and 2.4 and makes up 15 to 50% by weight of the copolyether ester, R represents a divalent residue remaining after the removal of carboxyl groups from at least one dicarboxylic acid having a molecular weight of less than 300, and D represents a divalent residue remaining after the removal of hydroxyl groups from at least one diol having a molecular weight of less than 250, where at least 80 mole percent of the dicarboxylic acid used consists of terephthalic acid or its ester-forming equivalents and at least 80 mole percent of the diol with the low molecular weight consists of 1,4-butanediol or its ester-forming equivalents, the sum of the mole percents of the dicarboxylic acid other than terephthalic acid or its ester-forming equivalents and the diol with the low molecular weight other than 1,4-butanediol or its ester-forming equivalents is no more than 20%, and the short-chain ester units make up 40–80% by weight of the copolyether ester.

Furthermore, the sealing tape of the invention can contain polymers which are wholly or partly copolyether esters in which at least 70 mole percent of the dicarboxylic acid used is 2,6-naphthalenedicarboxylic acid or its ester-forming equivalents and in which at least 70 mole percent of the diol used with the low molecular weight is 1,4-butanediol or its ester-forming equivalents, and the sum of the mole percents of the dicarboxylic acid other than 2,6-naphthalenedicarboxylic acid or its ester-forming equivalents and of the diol with the low molecular weight other than 1,4-butanediol or its ester-forming equivalents is no more than 30%, and the ester units with short chains make up 35 to 80% by weight of the copolyether ester. It is preferable if the polymers are copolyether esters which consist of a large number of recurring intralinear long-chain and short-chain ester units that are linked randomly head to tail by ester bonds, where the long-chain ester units correspond to the formula

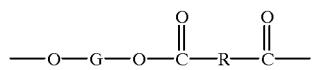

and the short-chain ester units correspond to the formula

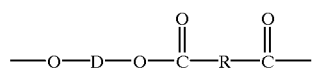

where G represents a divalent residue remaining after terminal hydroxyl groups are removed from at least one long-chain glycol with a mean molecular weight of 600 to 4000 and an atomic carbon-to-oxygen ratio of between 2 and 4.3, where at least 20% by weight of the long-chain glycol has an atomic carbon-to-oxygen ratio of between 2.0 and 2.4 and makes up 15 to 50% by weight of the copolyether ester, R represents a divalent residue remaining after the removal of carboxyl groups from at least one dicarboxylic acid with a molecular weight of less than 300, and D represents a divalent residue remaining after the removal of hydroxyl groups from at least one diol having a molecular weight of less than 250, where at least 70 mole percent of the dicarboxylic acid used consists of 2,6-naphthalenedicarboxylic acid or its ester-forming equivalents and at least 70 mole percent of the diol with the low molecular weight consists of 1,4-butanediol or its ester-forming equivalents, the sum of the mole percents of the dicarboxylic acid other than 2,6-naphthalenedicarboxylic acid or its ester-forming equivalents and the diol with a low molecular weight other than 1,4-butanediol or its ester-forming equivalents is no more than 30%, and the short-chain ester units make up 35–80% by weight of the copolyether ester.

The use of these polymers not only makes the sealing tape of the invention chemically inert to the substances in the piping systems, such as water, i.e. hot and utility water, town gas, etc., but it also means that when the pipeline is reconditioned or melted down absolutely no decomposition products containing halogens are formed.

Additionally, the sealing tape of the invention suffers only very minor weight loss, less than 0.2%, when the sealing tape is subjected to a temperature of 100° C. for 24 hours. Furthermore, when the ends of the pipe element are sealed with the screw joints using the sealing tape of the invention these seals prove to be highly resistant to vibrations as is indicated when the screw joints with the attached pipe element are coupled elastically to a weight of 5 kg and spun via a revolving claw a total of (20,000±500) times at a rate of 700 rpm.

The well-balanced sealing properties of the sealing tape of the invention, such as high resistance to temperature variations and sufficient shape stability under the compressive and shear stresses resulting from screwing the pipe element end into the screw fitting guarantee the sealing tape of the invention many years of use, both in screw pipe joints and in spigot pipe joints, without requiring continual checking due to the possibility of them becoming leaky or drying out. Likewise, compared to the state of the art the sealing tape of the invention has not only such excellent properties as good and rapid handling and simplified workability, or the fact that a piece of sealing tape of the invention can be torn off from a roll quickly and easily, but in addition the merits of safe disposal of screw pipe joints to which the sealing tape of the invention has been applied.

Furthermore, the sealing tape of the invention has an agreeable soft and satiny feel, and, moreover, no skin irritations or allergies are observed when it is handled.

Preferably the sealing tape of the invention can contain at least one base layer with an adhesive, whereby an agent which promotes and/or provides adhesion, such as mineral oils or diester oils, is preferred. Adhesives are understood to include glues or materials providing and/or promoting adhesion.

Shown to be advantageous as the material promoting adhesion is a paste-type sealant which can contain derivatives of resins with polyacrylates, mineral oils and/or diester oils, for example. Equally, the sealant can contain silicones, polysulfides and/or fluates.

When a nonwoven, felt, knitted fabric and/or woven fabric is employed as the base layer of the sealing tape of the invention it has been shown that the elongation at tear of the base layer (DIN 53 857), both longitudinally and transversely, should be at least 10%, and the fibers should be oriented in the longitudinal direction of the sealing tape. It is also possible to arrange the base layer on both sides of the functional layer such that the functional layer is inlaid in a base layer which is in the form of a tube.

A further advantage presented by the invention is that it allows for good adjustment, i.e., a shaped part such as an elbow which has been screwed in too far and has to be screwed out again a little can simply be screwed out without the known disadvantages arising. When polytetrafluoroethylene packing is used the packing is usually no longer leakproof after an adjustment has been carried out, which means that the shaped part has to be removed and then resealed and screwed in again.

When the sealing tape of the invention is employed no pastes are required as they are when hemp is used. This means that sealing can take place much faster than with commercially available hemp packings.

Disposal is environment-friendly since among other things no gases containing fluorine are produced on burning.

In comparison to sealants based on polytetrafluoroethylene the functional layer can be thicker, e.g., of a magnitude of 300–400 $\mu$m, for instance 350 $\mu$m. Thus, a higher weight per unit area can be achieved, around 80 g/m$^2$ for example.

With the sealing tapes of the invention an excellent thread stability can be achieved, so that the thread does not wobble. This is primarily of significance where, for example due to space restrictions, only a limited reach of thread can be utilized.

It is advantageous if on at least one side of the sealing tape there is an adhesive, which can be applied over the entire or part of the surface, in spots, strips or in a pattern. The adhesive can also be applied in corresponding manner on both sides of the sealing tape. The adhesive is preferably applied on a functional layer comprising a surface of the tape.

The adhesive is preferably based on a polymer with high molecular weight, especially polyacrylates. If a sealant is to be applied in one or more base layers, this is best done before the adhesive is applied.

The primary effect of the applied adhesive is to prevent the tape from coming undone when it is being wound onto the thread.

Particularly if the base layer is a nonwoven, it is advantageous for it to contain microfibers. Microfibers are superfine fibers with titers of a magnitude of 0.1 to 0.01 tex (cf. "Textile Faserstoffe" (Textile fibrous materials) by Wolfgang Bobeth, Springer Verlag Berlin 1993).

The sealing tapes can be put to a very wide range of uses. Apart from the applications mentioned earlier, they can be used among other things with fittings, valves, pipelines, etc. for industrial gases such as liquid gases, e.g. propane or butane, or with fittings, valves, pipelines, etc. for heating oil.

Embodiment Examples

A sealing tape in which polymers consisting of copolyether esters that are derived from longer-chain polyglycols, short-chain glycols with 2 to 4 carbon atoms, and dicarboxylic acids are used for the functional layer, and a nonwoven made up of polyester fibers is used for the base layer, with the functional layer as the underside, is laid on one end of a pipe element with an external taper thread, i.e., a Whitworth pipe thread, axially along the thread reach starting from the end of the thread and then wound from the start of the thread clockwise onto the thread largely without overlapping. Winding is performed clockwise on right-hand threads. The sealing tape is 1.2 cm wide, its functional layer is 10 $\mu$m thick and the woven layer is 380 $\mu$m thick when unstressed.

Eight test pieces of the same (each consisting of pipe element and screw fitting) are tested for leaks with compressed air at a pressure of 4.4 bar and a temperature of 230° C. for 10 minutes under water and during this time no air bubbles are seen.

Eight additional test pieces are heated to 1000° C. in an oven for one hour. Once a temperature equilibrium has been reached the test pieces are subjected to a test pressure of 1.1 bar (compressed air) in the oven. They are next cooled to room temperature for one hour in the oven with the door open. After the procedure of heating and cooling has been repeated six times at a pressure of 1.1 bar no leaks are detectable in the seal.

Eight additional test pieces are charged with cold water having a temperature of 50° C. Next, the hot water having a temperature of 900° C. is fed in. Here, too, no leaks are found in the seal or the screw fitting. Finally resistance to hot water is tested. Eight test pieces are filled with 200 ml and the pipe elements sealed off. The eight test pieces are filled with water and the pipe ends closed up. The test pieces are stored horizontally in an oven at 1300° C. for 72 hours. After the oven has cooled down the test pieces are taken out, the plugs removed at room temperature and the waterproofing tested at 230° C. and a test pressure of 25 bar. During the first ten minutes no water escapes from the test pieces.

In a further experiment the ends of screw fittings are wound once with the sealing tape of the invention and they are screwed into the internal thread of the piping of conventional extrusion pump blocks (spinning of chemical fibers by extrusion). The screw joints are subjected to a pressure of 1000 bar at room temperature for one day. No leaks occur.

Screw joints of a conventional superheated steam heater which have pipe elements around which the sealing tape has been wound once also remain leak-free, even when subjected to continuous temperature fluctuations of 1300° C. and a pressure difference of 2.2 bar for 14 days.

What is claimed is:

1. A method of sealing a pipe joint, comprising applying a sealing tape to at least one end of pipe of the pipe joint, said sealing tape including a waterproof functional layer having a thickness of 5 to 200 $\mu$m and comprising one or more polymers of polyetherester basis or polyetheramide basis; wherein the sealing tape further comprises at least one base layer arranged on at least one side of the functional layer, wherein the at least one base layer is one or more of a non-woven, felt, knitted fabric or woven fabric, and the nonwoven, felt, knitted fabric or woven fabric contains natural fibers of cotton, linen, jute, hemp, sisal, or mixtures thereof, or chemical fibers of synthetic fibers selected from the group consisting of polyester, polyamide, polyacrylic, polyvinylchloride fibers, or mixtures thereof.

2. The method in accordance with claim 1, wherein the at least one base layer is porous.

3. The method in accordance with claim 1, wherein the nonwoven, felt, knitted fabric or woven fabric has a weight per unit area of 5 to 200 $g/m^2$.

4. The method in accordance with claim 1, wherein the functional layer is glued to the at least one base layer in spots, in a grid pattern, in strips, or combinations thereof.

5. The method in accordance with claim 1, wherein the functional layer is joined to the at least one base layer by adhesion.

6. The method in accordance with claim 1, wherein the thickness of the functional layer is such that under compression the functional layer is not completely incorporated into interstices of the at least one base layer.

7. The method in accordance with claim 1, wherein the at least one base layer contains an adhesive.

8. The method in accordance with claim 7, wherein the adhesive is an agent which promotes adhesion, provides adhesion, or both.

9. The method in accordance with claim 8, wherein the agent promoting adhesion is a paste-type sealant.

10. The method in accordance with claim 8, wherein the agent promoting adhesion, providing adhesion, or both comprises mineral oils, diester oils, or mixtures thereof.

11. The method in accordance with claim 1, wherein the waterproof functional layer further has an adhesive applied to the functional layer.

12. The method in accordance with claim 1, wherein the waterproof functional layer further has an adhesive applied on both sides thereof.

13. The method in accordance with claim 1, wherein the nonwoven, felt, knitted fabric or woven fabric has a weight per unit area of 10 to 100 $g/m^2$.

14. The method in accordance with claim 1, wherein the functional layer has a thickness of 10 to 100 $\mu$m when unstressed.

15. The method in accordance with claim 1, wherein the pipe joint is a screw joint and the at least one pipe end is threaded.

16. The method in accordance with claim 1, wherein the pipe joint is a spigot pipe joint.

17. Method in accordance with claim 1, wherein the pipe of the pipe joint comprises fittings, heating pipes, utility water pipes, drinking water pipes, water vapor pipes, gas pipes, compressed air pipes, industrial valves or valves used in domestic installations.

18. Method in accordance with claim 17, wherein the heating pipes, utility water pipes, drinking water pipes, water vapor pipes, gas pipes and compressed air pipes are manufactured from cast iron materials or from thermoplastics.

19. Method in accordance with claim 18, wherein the cast iron materials are cast iron with lamellar graphite, white malleable cast iron, all-black malleable iron or cast steel.

20. Method in accordance with claim 1, wherein the sealing tape seals pipe joints of pipes for propane or butane gases.

21. Method in accordance with claim 1, wherein the sealing tape seals pipe joints of pipes for heating oil.

22. A method of sealing a pipe joint, comprising applying a sealing tape to at least one end of pipe of the pipe joint, said sealing tape including a waterproof functional layer having a thickness of 5 to 200 $\mu$m and comprising one or more polymers of polyetherester basis or polyetheramide basis, wherein the polymers are copolyether esters that are derived from longer-chain polyglycols, short-chain glycols with 2 to 4 carbon atoms, and dicarboxylic acids.

23. The method in accordance with claim 22, wherein the polymers are copolyether esters comprising a large number of recurring intralinear long-chain and short-chain ester units that are randomly linked head to tail through ester bonds, where the long-chain ester units correspond to the formula

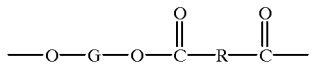

and the short-chain ester units correspond to the formula

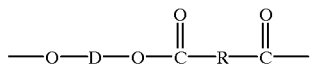

where G represents a divalent residue remaining after terminal hydroxyl groups are removed from at least one long-chain glycol with a mean molecular weight of 600 to 6000 and an atomic carbon-to-oxygen ratio of between 2.0 and 4.3, where at least 20% by weight of the long-chain glycol has an atomic carbon-to-oxygen ratio between 2.0 and 2.4 and makes up 15 to 50% by weight of the copolyether ester, R represents a divalent residue remaining after the removal of carboxyl groups from at least one dicarboxylic acid having a molecular weight of less than 300, and D represents a divalent residue remaining after the removal of hydroxyl groups from at least one diol having a molecular weight of less than 250, where at least 80 mole percent of the dicarboxylic acid used consists of terephthalic acid or its ester-forming equivalents and at least 80 mole percent of the diol with the low molecular weight consists of 1,4-butanediol or its ester-forming equivalents, the sum of the mole percents of the dicarboxylic acid other than terephthalic acid or its ester-forming equivalents and the diol with the low molecular weight other than 1,4-butanediol or its ester-forming equivalents is no more than 20%, and the short-chain ester units make up 40–80% by weight of the copolyether ester.

24. The method in accordance with claim 23, wherein the polymers are wholly or partly copolyether esters in which at least 70 mole percent of the dicarboxylic acid used is 2,6-naphthalenedicarboxylic acid or its ester-forming equivalents and in which at least 70 mole percent of the diol used with a low molecular weight is 1,4-butanediol or its ester-forming equivalents, and the sum of the mole percents of the dicarboxylic acid other than 2,6-naphthalenedicarboxylic acid or its ester-forming equivalents and of the diol with the low molecular weight other than 1,4-butanediol or its ester-forming equivalents is no more than 30%, and the ester units with short chains make up 35 to 80% by weight of the copolyether ester.

25. The method in accordance with claim 22, wherein the polymers are copolyether esters which consist of a large number of recurring intralinear long-chain and short-chain ester units that are linked randomly head to tail by ester bonds, where the long-chain ester units correspond to the formula

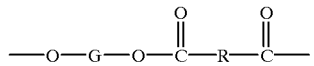

and the short-chain ester units correspond to the formula

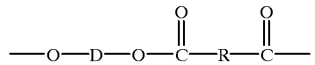

where G represents a divalent residue remaining after terminal hydroxyl groups are removed from at least one long-chain glycol with a mean molecular weight of 600 to 4000 and an atomic carbon-to-oxygen ratio of between 2 and 4.3, where at least 20% by weight of the long-chain glycol has an atomic carbon-to-oxygen ratio of between 2.0 and 2.4 and makes up 15 to 50% by weight of the copolyether ester, R represents a divalent residue remaining after the removal of carboxyl groups from at least one dicarboxylic acid with a molecular weight of less than 300, and D represents a divalent residue remaining after the removal of hydroxyl groups from at least one diol having a molecular weight of less than 250, where at least 70 mole percent of the dicarboxylic acid used consists of 2,6-naphthalenedicarboxylic acid or its ester-forming equivalents and at least 70 mole percent of the diol with the low molecular weight consists of 1,4-butanediol or its ester-forming equivalents, the sum of the mole percents of the dicarboxylic acid other than 2,6-naphthalenedicarboxylic acid or its ester-forming equivalents and the diol with a low molecular weight other than 1,4-butanediol or its ester-forming equivalents is no more than 30%, and the short-chain ester units make up 35–80% by weight of the copolyether ester.

26. A method of sealing a pipe joint, comprising applying a sealing tape to at least one end of pipe of the pipe joint, said sealing tape including a waterproof functional layer having a thickness of 5 to 200 μm and comprising one or more polymers of polyetherester basis or polyetheramide basis; wherein the sealing tape further comprises at least one base layer arranged on at least one side of the functional layer, and wherein the at least one base layer is one or more of a non-woven, felt, knitted fabric or woven fabric, and wherein fibers of the at least one base layer contain microfibers.

* * * * *